United States Patent [19]
Risch

[11] Patent Number: 5,471,629
[45] Date of Patent: * Nov. 28, 1995

[54] METHOD OF MONITORING CHANGES IN AN OBJECT-ORIENTED DATABASE WITH TUNED MONITORS

[75] Inventor: Tore J. M. Risch, Linköping, Sweden

[73] Assignee: Hewlett-Packard Company, Palo Alto, Calif.

[*] Notice: The portion of the term of this patent subsequent to Jul. 21, 2009, has been disclaimed.

[21] Appl. No.: 918,182

[22] Filed: Jul. 20, 1992

Related U.S. Application Data

[63] Continuation-in-part of Ser. No. 286,556, Dec. 19, 1988, Pat. No. 5,133,075.

[51] Int. Cl.$^6$ .................................................. G06F 7/20
[52] U.S. Cl. .................... 395/800; 395/600; 364/DIG. 1; 364/282.1; 364/276; 364/261; 364/251.7
[58] Field of Search .................................... 395/600, 800, 395/62, 109; 364/401, 419, 197, 408; 369/147, 408

[56] References Cited

U.S. PATENT DOCUMENTS

| | | | |
|---|---|---|---|
| 4,908,746 | 3/1990 | Vaughn | 364/147 |
| 4,974,173 | 11/1990 | Stefik et al. | 340/717 |
| 4,989,132 | 1/1991 | Mellender et al. | 395/600 |
| 5,133,075 | 7/1992 | Risch | 395/800 |
| 5,161,103 | 11/1992 | Kosaka et al. | 364/401 |
| 5,237,620 | 8/1993 | Deaton et al. | 364/401 |

OTHER PUBLICATIONS

Tore Risch, "Monitoring Database Objects", Hewlet Packard Labs, Proceedings of the 15th International Conference on Very Large Data Base, pp. 445–453, Aug. 1989.

James S. J. Lee, "An intelligent Real-Time Multiple Moving Object Tracker", SPIE, Applications of Artifical Intelligence, Apr. 1988, pp. 327–335.

Dana L. Small, "Real Time Data Base Management", Naval Ocean Systems Center, NTIS, Oct. 1987 pp. 189–194.

Hal Cheney, "Setting Multiple Relations in dBase III", OCLC Micro, vol. 3, No. 4 Aug. 1987 pp. 23–24.

*Primary Examiner*—Mehmet Geckil

[57] ABSTRACT

A method of monitoring objects in a database system. A client program requests monitoring of an attribute of an object in the database according to a criterion which is any of four tuning parameters. The parameters include a change value parameter, a delay time parameter, a synchronous initiation parameter, and a nervousness parameter. When an update is committed, a tracking application of a client which has requested monitoring of an attribute is invoked if the monitoring criterion specified by that client has been satisfied. The first three parameters have the effect of reducing the reactivity of the monitor. The change value parameter is satisfied if the value of the monitored attribute has changed by an amount not less than the specified change value. The delay time parameter is satisfied if at least the specified delay time has elapsed since the occurrence of a specified previous event. The synchronous initiation parameter requires that the commit be delayed until the tracker has been invoked by the notification; this parameter is satisfied by any change in value of the monitored attribute or by any of the other parameters if specified. The nervousness parameter, which increases the reactivity, is satisfied if a screening test, typically whether there has been a write to a specified relation or part of a relation, is satisfied.

12 Claims, 11 Drawing Sheets

METHOD OF MONITORING CHANGES IN AN OBJECT-ORIENTED DATABASE WITH TUNED MONITORS

CROSS-REFERENCE TO RELATED APPLICATION

This is a continuation-in-part of application Ser. No. 07/286,556, filed Dec. 19, 1989, scheduled to be issued on Jul. 21, 1992 as U.S. Pat. No. 5,133,075.

BACKGROUND OF THE INVENTION

The present invention relates generally to computer database systems, and more particularly to an improved method of monitoring changes in values of attributes of objects in an object-oriented database system by means of tuned monitors.

In an object-oriented database system, an "object" is a kind of entity An object has certain "attributes" or characteristics, associated with it. A "view" of an object is a set of some of the attributes associated with that object. To "materialize" a certain view respecting a given object means to provide the values of those attributes which make up that view.

Some attributes have values which are stored in the database; these attributes are accessed by retrieving them from storage. An "extensional" function is a procedure which is used for retrieving such values from storage. Other attributes have values which are not stored but rather are derived (by computation or the like) as needed; an "intensional" function is a procedure which is used for deriving such values (and which has no undesired side effects).

For example, an employer might have a database system for keeping certain information about its employees. Each employee would be known to the database system as an "object" of type EMPLOYEE. The database might include values for each of the following attributes of an EMPLOYEE object:
NAME
DATE OF BIRTH
HOME ADDRESS
MONTHLY SALARY
HIRE DATE
(In addition, the system gives each employee a unique identifier so that two employees having the same name can easily be distinguished.)

As already noted, some attributes can be derived from others. For example, every employee has an AGE, but if the system knows an employee's birthdate it can easily compute that employee's age. Therefore, to save space and to preserve system integrity only the value of the employee's birthdate is stored in the database; the employee's age is computed whenever it is needed.

An employee named Bill Johnson might be represented by the following attribute values in the database:
NAME: Bill Johnson
BIRTH DATE: Apr. 5, 1960
HOME ADDRESS: 123 Main Street, Palo Alto, Calif. 94303
MONTHLY SALARY: $2,500.00
HIRE DATE: Nov. 20, 1985

One "view" of an employee might consist only of the employee's name and address. Such a view might be used, for example, to have the computer print an envelope in which a notice to employees would be mailed. To "materialize" this view for a given employee it would be necessary to call two extensional functions—"Name" and "Address"—which would return the values of the attributes NAME and ADDRESS of the designated employee.

Another view of an employee might consist of the employee's name, age, monthly salary and number of years with the company. This view might be used, for example, to calculate how much to credit to the employee's retirement account. To materialize this view it would be necessary to call two extensional functions—"Name" and "Monthly Salary"—and two intensional functions—"Age" and "Number of Years with Company." The two intensional functions would return the required values of the attributes AGE and NUMBER OF YEARS WITH COMPANY by performing computations on other values returned by extensional or other intensional functions and which ultimately are derived from values which are stored in the database.

A typical computer system includes a central processing unit, a main memory, storage media such as magnetic disks, a terminal which includes for example a keyboard and a monitor screen, and a plurality of workstations. Each workstation comprises a terminal and usually a local processing unit and memory as well. Users at the various workstations use the computer to perform a variety of tasks.

A "client" of a database system is an applications program which interacts with the database system. Such a client program may be executed by the central processor or by a local processing unit in a workstation. A user may be running a plurality of client programs simultaneously.

Occasions may arise when a client needs to be alerted if certain values in the database are changed. In the example of the employee database discussed above, at one workstation a client program might be updating the database with respect to various financial matters, including the amount to deposit in each employee's retirement account for the previous month, while at a different workstation (possibly hundreds of miles away) another client program might be updating the database by posting all the salary raises which were granted during that month. The first client program must be alerted if anything done by either program results in changes in the values of financial data respecting one of the employees on whose retirement account the first client is then working.

More generally, a notification that a monitored value has changed may be needed for any of a number of purposes. A client may wish to be alerted if an abnormal condition occurs. The occurrence of a certain condition or set of conditions may be a signal to start running a certain application program. A graphic display may need to be updated whenever there is a change in a parameter being displayed. A client may need to recompute certain other values which depend on the value which has just changed (as in the above example of the employee retirement account).

Monitoring imposes a heavy computational and input/output overhead on a database system, especially if the system is large and a number of values are being monitored at the same time for several different clients. Various methods have been proposed to minimize this overhead. For example, in one such system an "alerter" is called if specified boolean conditions are satisfied (O. P. Buneman and E. K. Clemons, "Efficiently Monitoring Relational Databases," ACM Transactions on Database Systems 4, 3, Sep. 1979, pp 368–382). A "retrieve always" mechanism in another system causes queries to be re-executed upon each update to specified relations (M. Stonebraker, "Triggers and Inference in Database Systems," in M. Brodie and J. Mylopoulos (eds.), On Knowledge Based Management Systems, Springer-Verlag, 1986).

Systems of "triggers" have been proposed for relational database systems; such triggers typically invoke a database procedure upon updates of user-specified base relations (see, for example, M. Astrahan et al., "System R: A Relational Approach to Database Management," ACM TRansactions on Database Systems, 1 (2), June 1976). Some examples of systems including triggers are Sybase, proposed by Darnovsky et al., Transact-SQL User's Guide, Sybase Inc., 2910 7th Street, Berkeley Calif. 94710, 1988, and HiPac, proposed by McCarthy et al., "The Architecture of an Active Database Management System", Proc. SIGMOD, Portland, Oreg., 1989, pages 215–224 and by Dayal et al., "Rules Are Objects Too: A Knowledge Model for an Active, Object-Oriented Database System", Advances in Object-Oriented Database Systems, 2nd International Workshop on Object-Oriented Database Systems, Sept. 1988, pages 129–143. HiPac provides a "coupling mode" between a trigger and a set of actions on a database. The coupling mode controls when a trigger is executed relative to a triggering condition. The trigger, in other words, is action oriented rather than value oriented and connects its coupling mode to the updating action.

A technique which is somewhat similar to the trigger system is the use of a "declarative integrity constraint," in which a proffered update to the database is rejected if specified boolean conditions are not satisfied at commit time (see, for example, M. Stonebraker, "Implementation of Integrity Constraints and Views by Query Modification," Proc. ACM SIGMOD Conf., San Jose, Calif., May 1975).

Another technique, access-oriented programming, is implemented in some object-oriented languages such as "LOOPS". A message to set values of instance variables is intercepted by means of a user-provided trigger procedure which may in turn set or display some other value (M. J. Stefik et al., "Integrating Access-Oriented Programming Into a Multiparadigm Environment," IEEE Software 3, 10, Jan. 1986, pp. 10–18). The trigger procedures are dynamically added and removed from running systems to avoid interfering with other system logic (K. Osterbye, "Active Objects: An Access Oriented Framework for Object-Oriented Languages," Journal of Object-Oriented Programming, Vol. 1, No. 2, June/July 1988, pp. 6–10).

Expert systems such as "SYNTEL" and "OPS5" provide a method of monitoring virtual memory data retrieved from persistent data (R. Reboh and T. Risch, "Syntel: Knowledge Programming Using Functional Representations," Proc. AAAI-86, Philadelphia, Pa., August 1986, pub. Morgan Kaufman, Los Altos, Calif., 1986, pp. 1003–1007).

A method of monitoring changes in attribute values of objects in an object-oriented database system is disclosed in the aforementioned U.S. Patent. By way of example, an object-oriented database system is described in Fishman et al., "Overview of the IRIS DBMS" in Kim and Lochovsky, Object-Oriented Concepts, Databases, and Applications, ACM Press, 1989. The IRIS database management system will be referred to occasionally herein for convenience to exemplify the teachings of the aforesaid U.S. Patent and of the present invention, but it will be understood that neither the aforesaid Patent nor the present invention is to be limited to the IRIS system.

The method as taught in the aforesaid U.S. Patent interacts cooperatively with client programs to provide a localized method of (a) monitoring an object in an interactive, object-oriented database system in response to a request from a client program and (b) invoking an application procedure designated by the client if a change in a monitored attribute value is detected. High-overhead tasks are performed at times when monitoring is not taking place so as to minimize any overhead imposed on the system during actual monitoring. The invoked procedure is sometimes referred to herein as the "tracking procedure" ("tracker" for short) because it "tracks"—that is, is invoked by a change in—the monitored attribute.

A preferred embodiment of that method includes keeping records of any request from a client to monitor an attribute of an object in the database, any interdependence relationships between the monitored attribute and other attributes, the value of the attribute being monitored, this latter record being kept by accessing the interdependence record, and any update transactions initiated by a client during an update session.

When the initiating client requests that the transaction be committed, the system determines which monitored attributes may have been affected and then determines whether the values of any of said attributes have in fact changed. For each value which has changed, the system notifies any client which had requested monitoring of that attribute. The client which requests the commit is notified during the process of determining whether the values have changed. Other clients are notified after the update has been committed to the database.

Alternatively, any client may at any time request notification of any changes that have occurred in any monitored attributes subsequent to a previous notification. The event which triggers notification is the notification request as opposed to the request to commit an update, and only the requesting client receives the notifications.

"Notifying" a client means interrupting any task then being performed by the client and invoking a predesignated tracking procedure. The tracking procedure is an application program procedure that is called by the database system when a result change has been detected. Thus the tracker is part of the application program and is ordinarily written in the same language as that program. The database system does not send data to the tracker when a result change has occurred; instead, the tracker can freely access the database to retrieve the current result of the monitored query. Thus, change detection (invoking the tracker) is distinguished from retrieving the new result.

If the client is not in an interruptible state when a change in a monitored attribute is detected, a record is kept of notifications intended for that client until the client enters an interruptible state or requests notification.

In the IRIS database system a parameterized query (a query having a set of actual parameters) is called a "derived function". A derived function is access-path-optimized for arbitrary parameters similar to canned queries in relational database systems as described in Chamberlin et al., "Support for Repetitive Transactions and Ad Hoc Queries in System R" Transactions on Database Systems, Vol. 6, No. 1, March 1981, pp 70–94. In IRIS, object attributes are modeled by derived functions where the first parameter typically is bound to the object identifier. For example, a certain derived function might retrieve the highest paid employee for any given department.

If a first process commits (stores in the database) an update, a tracker of a second process will be invoked asynchronously if the update changes the result of a query being monitored by the second process. Monitoring processes are autonomous from updating processes; this means that the committing transaction does not wait for the tracking procedure to finish.

A database monitor can be compiled once for a given query, as discussed in the aforesaid patent and in Risch, "Monitoring Database Objects" in Proceedings of the 15th Conference on Very Large Databases (Amsterdam, Holland)

1989, pp. 445–453. Activating a monitor in an application process informs the database system that it must henceforth invoke the tracker whenever a result change is detected for a given query and parameters. A monitor is deactivated either explicitly or when the process is terminated.

If the tracker is invoked exactly every time there is a result change, as disclosed in the aforesaid patent, there is "perfect tracking". In practice it may not be possible or desirable to achieve perfect tracking. Accordingly, there is a need for a way to adjust the tracking in such a way that client programs are notified of changes in monitored attributes neither more nor less often than is desirable.

SUMMARY OF THE INVENTION

The present invention provides a method of tuning a database attribute monitor such that a client program is notified of changes at such times as are optimal for the client. This leads to improved efficiency of the database system and optimal results from each of a plurality of client programs.

Briefly and in general terms, the present invention provides a method of monitoring an object in a database in response to a request from any of a plurality of client programs. This method, which is practiced in a computerized database system, includes keeping several records. These records, all of which are kept by the system, include a record of any request from a client to monitor an attribute of an object, a record indicating any interdependence relationships between the attribute being monitored and other attributes, a record of the value of each attribute being monitored (this record is kept by accessing said interdependence relationship record), and, during a database update session, a record of any database update transactions initiated by a client.

In one aspect of the invention, a client which has initiated an update transaction requests that said update transaction be stored in the database. The system thereupon determines whether a predetermined criterion respecting a monitored attribute has been satisfied and, if the criterion has been satisfied, the system notifies any client which had requested monitoring of that attribute. This notification invokes the tracking procedure of that client. Of course, if several different clients receive the notification, a different tracker is ordinarily invoked for each client.

In another aspect of the invention, if a client requests notification of any changes which have occurred in an attribute then being monitored for said client, the system determines whether a predetermined criterion respecting a change in the monitored attribute has been satisfied and, if the criterion has been satisfied, the system notifies said client accordingly. This notification invokes the tracker of that client.

The criterion is any of four tuning parameters. These parameters include a change significance parameter, a tracking delay time parameter, a nervousness parameter, and a synchronous initiation parameter.

In the case of the change significance parameter, the criterion is a minimum change value in the monitored attribute. Whether the criterion has been satisfied is determined by determining whether the monitored attribute may have been affected by the update transaction and, if so, determining whether the value of the attribute has changed by an amount which exceeds the minimum change value. Whether the attribute has changed, and if so by how much, are determined by computing an updated value for the attribute and comparing the updated value with the value in the attribute value record. Thus, the client is notified only of changes that exceed a predetermined significance level.

In the case of the tracking delay time parameter, the criterion is a minimum time interval. Whether the criterion has been satisfied is determined by determining whether the monitored attribute may have been affected by said transaction and, if so, determining whether an amount of time that exceeds the minimum time interval has elapsed subsequent to a previous event. If the minimum time interval has elapsed, the system goes on to determine whether the value of the attribute has changed by computing an updated value for the attribute and comparing the updated value with the value in the attribute value record. The previous event typically is a previous change in the value of the monitored attribute. Thus, the client is not notified of changes more often than once in a defined interval of time.

The preceding two tuning parameters may be combined such that the client is only notified of changes that exceed the desired value, and then only once in the defined time interval.

In the case of the nervousness parameter, a simplified monitor that actually generates too many notifications is used. This is desirable, for example, if the overhead of generating and responding to too many notifications is less than the overhead of more precise monitoring. Whether the criterion has been satisifed is determined merely by observing whether a simple event has occurred. The event typically is an update to a specified relation or, in a more precisely-tuned aspect, to a specified row, column or value in a specified relation.

In the case of the synchronous initiation parameter, the tracker is invoked synchronously, that is, at the same time as an update commit is begun. This means the tracker is initiated before any change is actually stored in the database. In this case, the criterion may be any change in the value of the monitored attribute, or it may be only a change which exceeds a minimum change value, or it may be a nervousness parameter if the advantage of a low-overhead monitor is desired.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4 is a flow chart illustrating a view creation procedure;

FIG. 5 is a flow chart illustrating a monitor definition procedure;

DESCRIPTION OF THE PREFERRED EMBODIMENT

Figure 1:
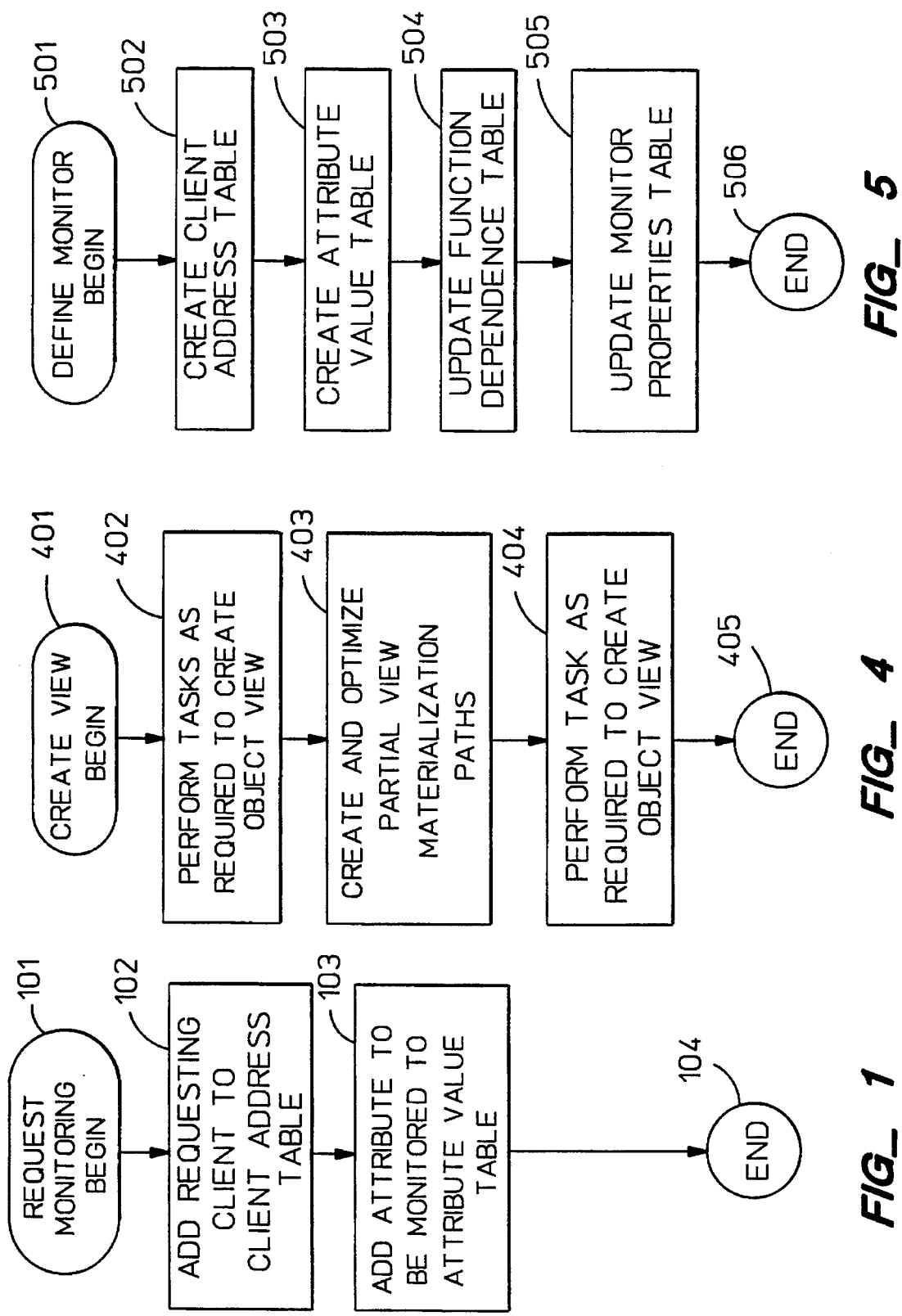
FIG. 1 is a flow chart illustrating a procedure for keeping a record of monitor requests according to the invention.

As shown in the drawings for purposes of illustration, the invention is embodied in a novel method of monitoring an attribute of a database object wherein a client program is notified of a change only if a selected monitor criterion is satisfied. There has been a need for an efficient way to control monitoring of database objects so that a client is notified neither more nor less often than necessary.

A method of monitoring an object according to the present invention includes keeping records of monitor requests, interdependence relationships between monitored attributes and other attributes, values of monitored attributes, and update transactions. If a predetermined criterion respecting a monitored attribute is satisfied, the client is notified. The criterion may be any one or more of four tuning parameters which include a change significance parameter, a tracking delay time parameter, a nervousness parameter, and a synchronous initiation parameter. Monitoring database objects by means of these criteria leads to improved efficiency of the database system and optimal results from each of a plurality of client programs.

Figure 2:
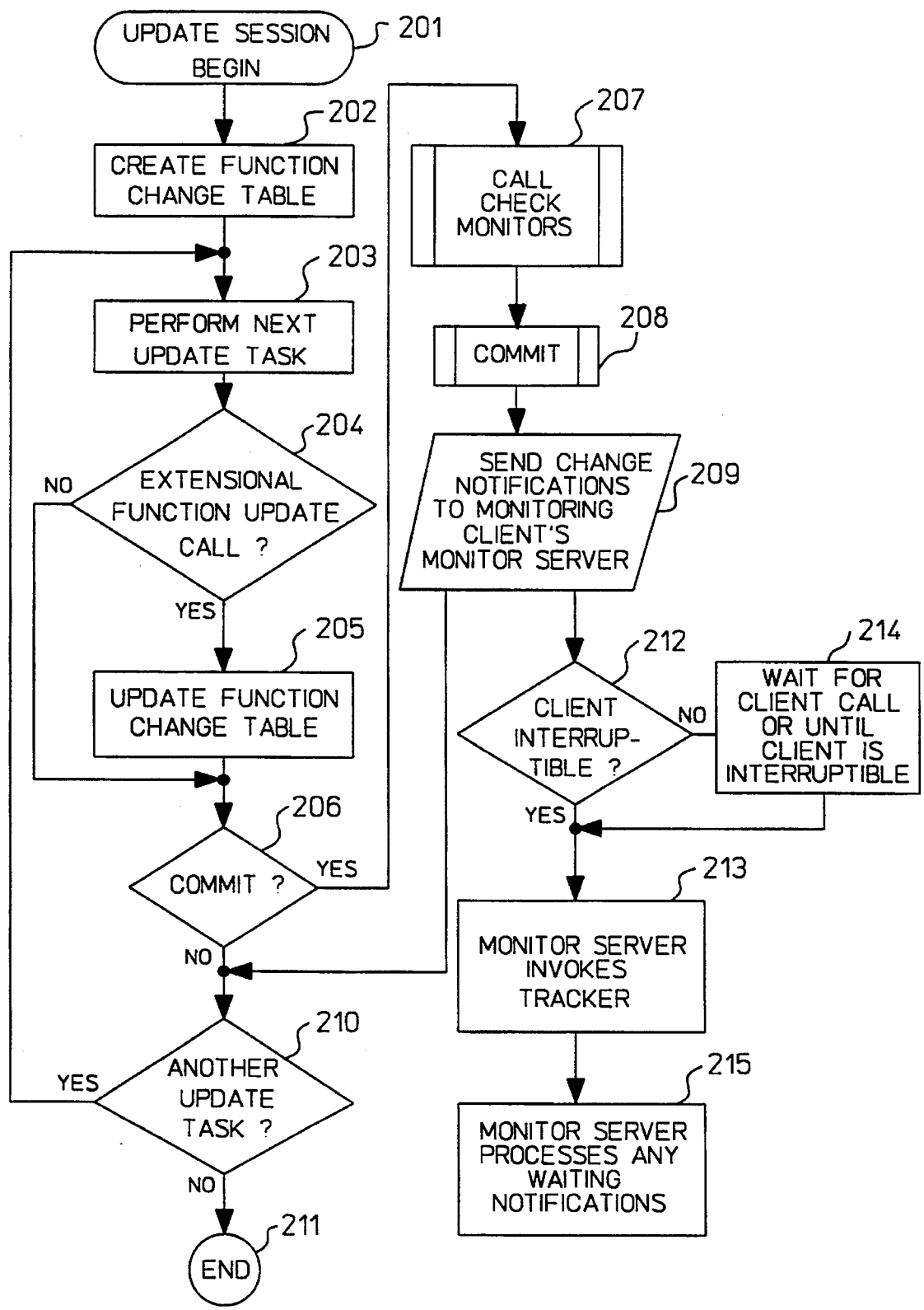
FIG. 2 is a flow chart illustrating a procedure for an update session according to the invention.
Figure 3:
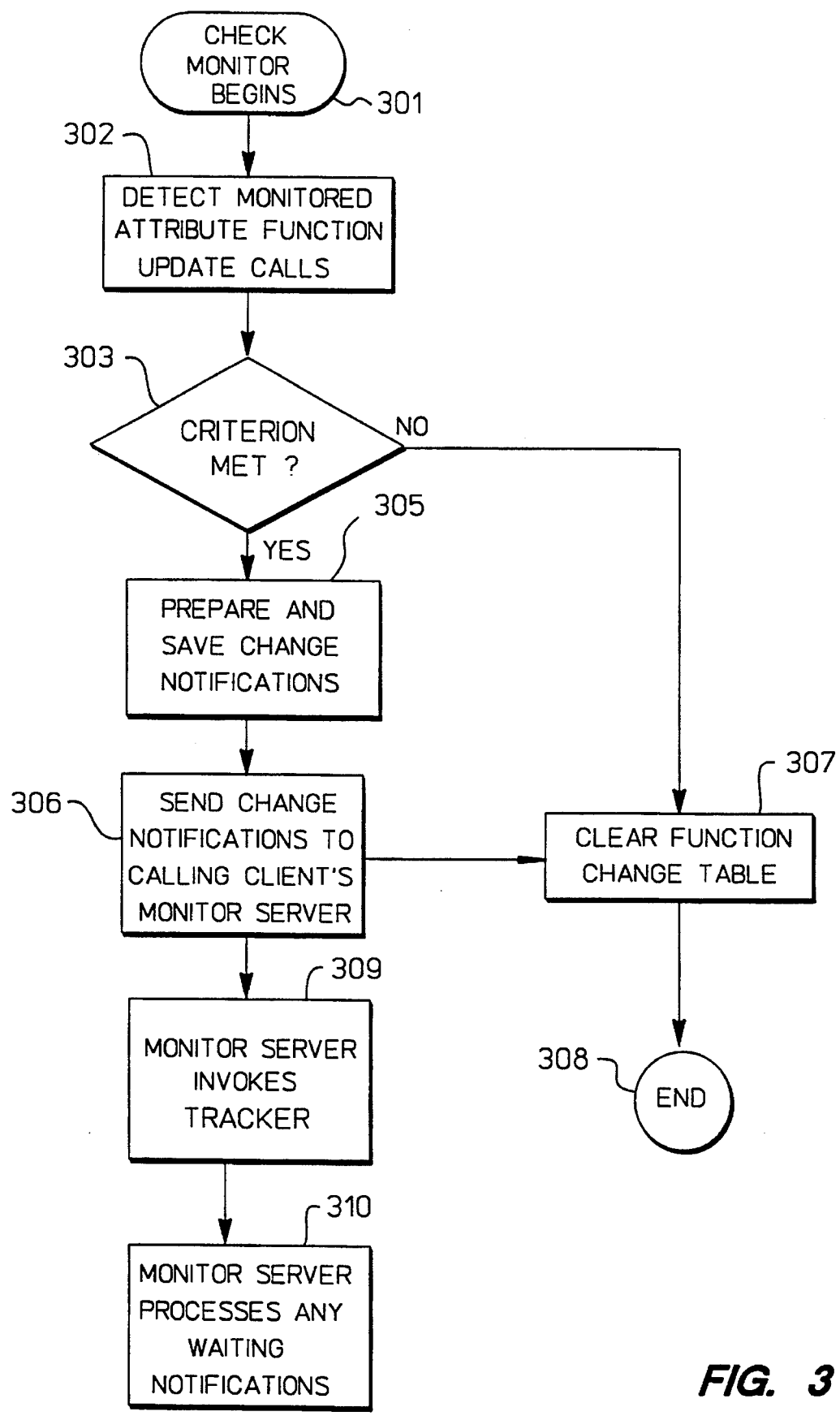
FIG. 3 is a flow chart illustrating the "Check Monitors" procedure which is called from the procedure shown in FIG. 2.

According to a first preferred embodiment of the invention, a method of monitoring an object in a computerized database system in response to a request from any of a plurality of client programs comprises the following steps carried out by the system:

keeping a record of any request from a client to monitor an attribute of the object, as illustrated in FIG. 1;

keeping a record indicating any interdependence relationships between the attribute being monitored and other attributes, as generally illustrated in FIGS. 4 and 5;

keeping a record of the value of each attribute being monitored, as depicted by a block 103 in FIG. 1, by accessing said interdependence relationship record;

during a database update session, keeping a record of any database update transactions initiated by a client, as depicted by blocks 202 and 205 in FIG. 2; and if a client which has initiated an update transaction requests that said update transaction be stored in the database, determining whether a predetermined criterion respecting a monitored attribute has been satisfied, as illustrated in FIGS. 2A and 3A, and, if the criterion has been satisfied, notifying any client which had requested monitoring of that attribute, as depicted by a block 306 in FIG. 3 and a block 209 in FIG. 2.

The record of client requests is preferably kept by means of a "Request Monitoring" procedure as illustrated in FIG. 1. The procedure is begun (block 101) by receipt of a request from a client to monitor a certain attribute. The request is entered in a "Client Address" table (block 102) and an "Attribute Value" table (block 103), and the procedure thereupon ends (block 104). The structure of these tables will be discussed in more detail in a subsequent paragraph.

The record of database update transactions is preferably kept by creating and updating a "Function Change" table during an "Update Session" procedure as illustrated in FIG. 2. The procedure is begun (block 201) by a client initiating an update session. The system creates the Function Change table (block 202) and then proceeds with an update task as directed by the client (block 203). If the task included an extensional function update call (block 204), the function which was called is entered in the Function Change table (block 205); if not, no entry is made in the table. The client decides whether to commit any updates made thus far (block 206), and if the client requests that such updates be committed a "Check Monitors" procedure is called (block 207).

Determining whether the criterion for notification has been satisfied and, if so, notifying the appropriate clients, is preferably accomplished by means of the Check Monitors procedure as illustrated in FIG. 3. As described above, the procedure is initiated (block 301) by a procedure call generated during an update session (the procedure may also be called directly by a client as will be discussed in more detail in a subsequent paragraph). Any update function call which might have resulted in a change to a monitored attribute value is detected (block 302). In most instances this accomplished by reference to the Function Change table and to a "Function Dependence" table (to be described hereafter). If the criterion is a nervousness parameter, any update to a relation specified by the indicator signals a possible change to a monitored attribute value.

At this point, what happens is determined by which monitor tuning criteria have been selected. This will be discussed in more detail below with reference to FIG. 6. If whichever criterion was selected has been satisfied (block 303), a change notification is prepared and saved (block 305) and sent to the client which called the procedure (block 306). Because in this instance the procedure was called by a commit request made by an update client, the update client is the one which receives the notification. The Function Change table is cleared (block 307) and the procedure ends (block 308).

Referring again to FIG. 2, after the Check Monitors procedure is concluded the updated data is committed to the database (block 208). "Committing" means storing the updated data in the database and deleting any superseded data. In most cases the "commit" is executed immediately, but if the monitoring criterion specifies synchronous notification the actual "commit" will be delayed until the notification has been initiated, as will be described in more detail below with reference to FIG. 7. Then the saved change notification is sent to any other client which had requested monitoring of the changed attribute value (block 209). If there is another update task to perform (block 210), such task is performed (block 203) and the above-described steps are repeated. When there are no more update tasks to perform, the update session ends (block 211).

It will be noted that a loop is defined by blocks 203, 204, 205, 206 and 210. In the absence of a commit decision (block 206), each update task results in one pass through the loop. Except for updating the Function Change table, the loop imposes no overhead which would not be imposed in the absence of the monitor procedure. As already noted, the Function Change table is small and resides in main memory and therefore the requirement to update it imposes very little overhead; moreover, even this small amount of overhead is skipped (block 204) unless the update task being performed includes an extensional function update call. Thus, the overhead imposed during an update session is kept to a minimum.

Notifying a client preferably comprises interrupting any task then being performed by the client and invoking a predesignated tracking procedure, for example by sending the notification to a portion of the client program referred to as a "monitor server". If the client being notified is the one which called the Check Monitors procedure (usually this will be the client which requests that updates be committed), this is done when a change in the monitored attribute value is detected (block 309 of FIG. 3).

If the client being notified is not the client which called the Check Monitor procedure, a determination is made, for example by that client's monitor server, whether the client is in an interruptible state (block 212 of FIG. 2). If the client is in an interruptible state, the monitor server invokes the tracker (block 213). If the client is not in an interruptible state, the monitor server waits (block 214) and keeps a record of the notification either until the client enters an interruptible state at which time the monitor server interrupts the client or until the client requests notification.

When a client's monitor server interrupts a client, in addition to invoking the tracker the monitor server also processes any waiting notifications (block 215 in FIG. 2 and block 310 in FIG. 3).

Preferably, a partial view materialization path for a given attribute is created in advance of any request to monitor that attribute. This is done during a "Create View" procedure as depicted in FIG. 4. The Create View procedure is a relatively high-overhead task which is ordinarily performed during creation of the database or if necessary at other times, preferably when the system is not otherwise busy.

The Create View procedure is begun (block 401) by a user who instructs the system to create a view of an object. Various tasks are performed (block 402) by the system in creating such a view; the nature of these tasks is known to those skilled in the art and will not be further discussed herein. In addition to said tasks, the system creates and optimizes a partial view materialization path for each attribute of the view (block 403). After completing any other tasks associated with creating the view (block 404) the procedure ends (block 405).

The partial path for a given attribute constitutes a minimum number of steps needed to access only that one attribute without materializing the entire view. Later, if a request is made to monitor one of these attributes, this partial path is used to access the attribute. In the absence of such a path, it would be necessary to materialize the entire view just to access the one attribute being monitored, a step which would impose more overhead on the system than is imposed by using the partial path.

Preferably a monitor is defined for a given attribute in advance of any request to monitor that attribute. This is done by means of a "Define Monitor" procedure as illustrated in FIG. 5. As was the Create View procedure, the Define Monitor procedure is a relatively high-overhead task which is preferably carried out when the system is not otherwise busy.

The Define Monitor procedure is begun (block 501) by a user who tells the system which attribute is to be monitored. As discussed above, every attribute is accessed by a function (either an extensional function or an intensional function), and the monitor procedure which is defined for a given attribute is defined in terms of the function which accesses that attribute (this function is hereafter referred to as "the monitored function").

The Define Monitor procedure preferably includes creating means for keeping the record of client requests. More particularly, a Client Address table is created (block 502) for the monitored function. This table includes positions for recording a client's identification, a client's address (for example, a workstation location) and a name of a procedure designated by the client.

Later, when a client requests monitoring of an attribute, the client's identification, address, and tracking procedure designation are entered in the Client Address table for the function which accesses that attribute. The information in the table tells the system which client procedure to invoke upon detecting a change in the monitored attribute and where to send the notification that the tracker is to be invoked.

The Define Monitor procedure preferably includes creating means for keeping a record of the value of the attribute being monitored. More particularly, an Attribute Value table is created (block 503) for the monitored function. This table includes positions for recording the value of the attribute accessed by the function.

Later, when monitoring is begun, the then-current value of that attribute is calculated and entered in the table. Comparison of that value with the of the monitored attribute after an update tells the system whether the monitored value was in fact changed as a result of the update.

Appropriate entries are made in the above-described tables to specify which one or more of the tuning criteria have been specified by the client.

A single Function Dependence table is used to correlate extensional functions with intensional functions. As previously indicated, an intensional function accesses an attribute value by computation or the like based on other attribute values. A change in one of these other values may result in a change in the value accessed by that intensional function. Accordingly, if an attribute which is accessed by an intensional function is being monitored, any change in any of the values which are used in accessing the monitored attribute must be detected in order to determine whether the monitored value has changed. The Function Dependence table provides this correlation.

Accordingly, during monitor definition, if the function which accesses the attribute to be monitored is an intensional function, that function is listed in the Function Dependence table together with each extensional function which could change any of the values which are utilized by that intensional function in accessing the monitored attribute. Later, when Check Monitors is called, the extensional function update calls as listed in the Function Change table are compared with the listings in the Function Dependence table. In this way, the system detects update function calls which may have resulted in changes to monitored attributes (block 302).

Finally, the Define Monitor procedure preferably includes updating a "Monitor Properties" table (block 505). This table is a housekeeping table which tells the system where to find the Client Address and Attribute Value tables associated with each monitored function. After performing this step, the Define Monitor procedure ends (block 506).

The monitor criteria will now be described in more detail. It will be recalled that each monitor criterion is one of four tuning parameters: a change significance parameter, a tracking delay time parameter, a nervousness parameter, and a synchronous initiation parameter.

The frequency with which a given tracker is invoked will be referred to herein as the "reactivity" of the monitor activation. If a tracker is invoked less often than every time the monitored attribute changes, the monitor activation is said to "underreact". The reactivity of a given monitor activation depends on five factors: (a) the structure of the monitored query, (b) the update frequency of the data over which the monitored query is defined, (c) the execution time of the procedure which the client performs when it receives a notification, (d) the overhead for the database system to detect a change and transmit the notification, and (e) the tuning parameters.

If a monitored attribute in a database is being intensively updated, the reactivity can become very high, resulting in high overhead and network traffic. In the worst case, the monitoring application will spend all its time invoking tracking procedures in response to monitor notifications. Tuning the monitor according to the method of the invention solves this problem.

The change significance parameter provides one way to reduce the reactivity of a monitor activation. This parameter has the effect of making the tracker react only to "significant" changes in the value of the monitored attribute. The client defines what is a "significant" change by specifying a minimum value for the change significance parameter. This minimum is specified either as an absolute difference (for example, ten dollars) or as a relative difference (for example, a change of 10%). For a query that returns a set of values, the significance test is preferably applied to every value in the set such that if any value changes by an amount that exceeds the minimum change value, the client is notified.

The client may dynamically change the value of this parameter as needed. For example, it may be desired to decrease the reactivity temporarily if the client must concentrate on a critical task.

It will be apparent that the comparison can be more complex than the above examples, as in "fixed thresholding" or "moving averages". Fixed thresholding can be specified by inequality comparisons. An example of time-consuming reasoning that may be required in making a comparison is described in Washington et al., "Input Data in Real-Time AI Systems" 11th International Joint Conference on Artificial Intelligence, 1989, pages 250–255. Simple comparisons are more easily optimized than complex ones and ordinarily impose less overhead on the system.

Another way to decrease the reactivity is by means of the tracking delay time parameter. As an example, if the failure rate of a certain part is being tracked, it may be desirable to display the failure rate only once each ten minutes. Thus, with this tuning parameter, the tracker is invoked only if the monitored attribute has changed and at least the specified number of time units have passed since the last time the tracker was invoked.

As has already been discussed, tracking delay time may be combined with change significance value to still further reduce the reactivity.

Synchronous initiation of a tracker means the tracker is invoked before the change which caused the invocation is committed. When synchronous initiation is in effect, if the updating client instructs the database system to commit an update of an attribute, the actual execution of the commit must wait until any other client which is monitoring that attribute has been notified.

Synchronous initiation is very expensive when monitoring data that is being updated intensively. This is because every commit must wait until the system has determined whether an attribute being monitored has changed and then has notified any client monitoring such attribute. Synchronous initiation, then, decreases the reactivity at the expense of slowing down the entire system. This should be avoided unless the overhead of monitoring and notifying can be kept to a minimum.

If a tracker is invoked too often, that is, more often than the monitored attribute has changed, it is said that the monitor is overreacting rather than underreacting. This is also referred to as a "nervous" monitor. For a nervous monitor, a test that "suspects" a monitored attribute has changed is sufficient. Sometimes such a test has very low overhead, and in such cases a nervous monitor is highly advantageous. Such a test is referred to as a "screening" test.

A preferred embodiment of a screening test is a test of the write set of an update transaction. A trivial example would be to test whether an update transaction includes a write command. This would usually generate too many notifications. A better test is to test whether a certain relation is included in the write set. A more refined test is whether a certain row or column of a specified relation is included in the write set.

It should be noted that a screening test may be used as part of a non-nervous monitor; used in such a way, a screening test provides a quick way to screen out irrelevant updates before doing a full test of whether a specific monitored attribute has changed. However, such use of a screening test is different than using the screening test by itself as the monitor.

A nervousness indicator is advantageously combined with synchronous initiation to avoid having to do an expensive test every time an update transaction occurs. This is particularly advantageous if there are a large number of update transactions, because when synchronous initiation is in effect every update must be delayed until the tracker has been invoked. Using the nervousness indicator reduces the duration of such delays.

A nervousness indicator is also sometimes used in combination with a delay tracking time parameter.

Figure 6:
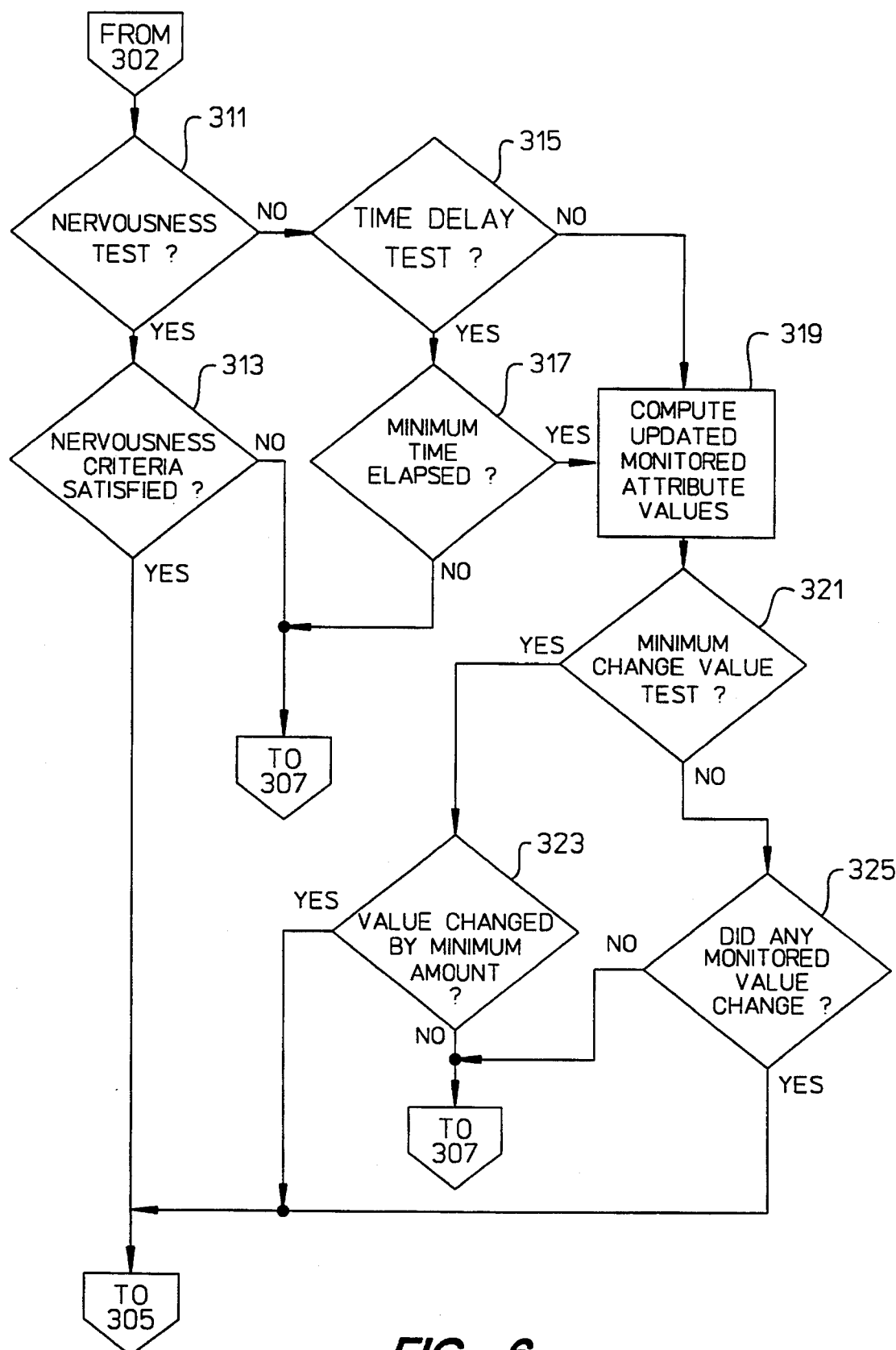
FIG. 6 is a flow chart illustrating the "Criterion Met?" procedure which is called from the procedure shown in FIG. 3.

The "Criterion Met?" procedure indicated by the block 303 in FIG. 3 will now be described in more detail with reference to FIG. 6. If the criterion is a nervousness indicator, that is, any change in a specified relation in the database or in a particular item such as a specified row or column in such relation, then detecting an update call to that relation, as in the block 302 of FIG. 3, is enough to indicate that the criterion has been met. This is indicated symbolically in FIG. 6 by a "Nervousness Test?" block 311 and a "Nervousness Criterion Satisfied?" block 313.

It will be apparent that the blocks 311 and 313 are intended to be graphically illustrative of how the invention works, but not necessarily indicative of actual steps in a computer program. Thus, the three blocks 302, 311 and 313 might be implemented as a single step or as several steps. In general, this is also true of the other blocks in FIG. 6 and in the other flowcharts herein; they are intended to exemplify the functioning of the invention, not to specify the only possible structure and sequence of a specific computer program implementing the invention.

If, as indicated by a block 315, the criterion is a time delay, that is, a requirement that a minimum amount of time have elapsed subsequent to a previous event such as a previous change in the value of the monitored attribute, and if the minimum time has not elapsed as indicated by a "no" output from a "minimum time elapsed?" block 317, the procedure ends without notification.

If the criterion is not a time delay, or if the criterion is a time delay and the required time has elapsed, updated values of monitored attributes are computed as indicated by a block 319. If the criterion is a minimum amount of change in the value of the monitored attribute, as indicated by a block 321, and if the attribute has changed by at least the minimum amount, notifications are initiated as indicated by a "yes"

output from a block 323. If the criterion does not require a minimum change in value, then any change in the value of the monitored attribute results in a notification as indicated by a "yes" output from a block 325.

Figure 7:
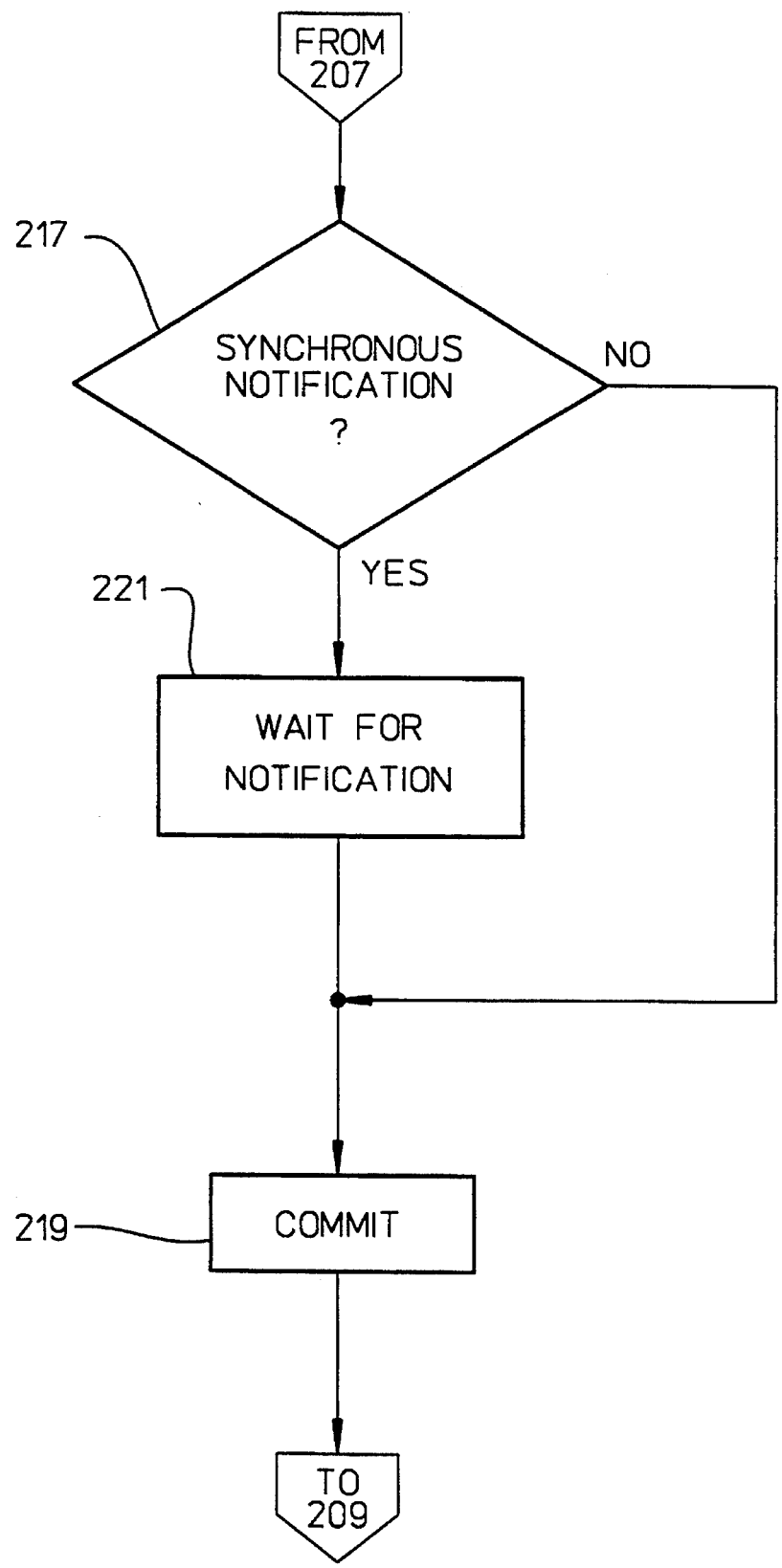
FIG. 7 is a flow chart illustrating the "Commit" procedure which is called from the procedure shown in FIG. 2.

The synchronous notification requirement will now be discussed with reference to FIG. 7, which illustrates the "commit" procedure as represented by the block 208 in FIG. 2. If the criterion includes synchronous notification, as indicated by a block 217, the actual commit operation 219 is delayed, as indicated by a block 221, until the requesting client has been notified that the monitored attribute has been changed. Typically the commit operation need not be delayed any longer; that is, there is no need to await completion of any procedure performed by the notified client as a result of the notification. Synchronous notification only pertains to notification of clients other than the one that initiates the update.

The invention as described provides for notification to be sent to each client monitoring a given attribute when a client which is updating the data base decides to commit any changes. Some clients may need to check for changes at other times. Accordingly, in a second preferred embodiment any client which is monitoring an attribute may call the Check Monitors procedure at any time and receive notifications respecting changes to attributes being monitored by that client.

It will be apparent that any such changes will be changes which have not yet been committed to the database. Accordingly, notification of such changes is not sent to any client other than the one which called the Check Monitors procedure, and synchronous notification would not be applicable. However, a record of such changes is kept (block 305) for later notification of other clients and the Function Change table is cleared (block 307). If there are no further changes in the monitored value, then the notifications are sent to the other clients at commit time (as indicated by blocks 209 and 215 in FIG. 2 and 310 in FIG. 3). If there are further changes, then such changes will be detected at commit time and appropriate notifications will be sent. Thus, clients other than the client which invokes the Check Monitor procedure are assured that changed data either have been committed to the database at the time the clients are notified of the changes or, if synchronous notification is specified, will be committed synchronously with the notification.

Figure 8A:
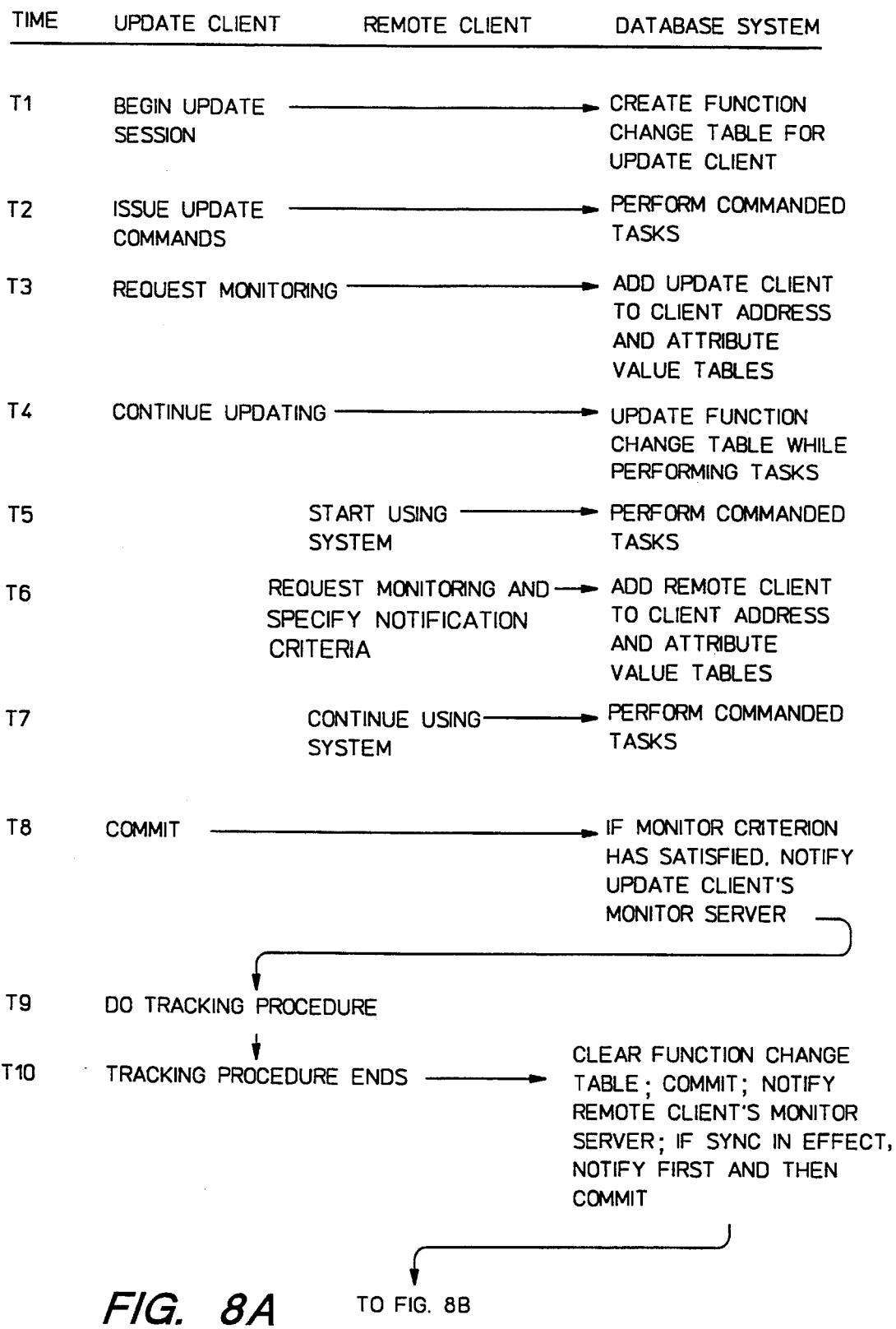
FIGS. 8a and 8b are a time line chart of a database session including object monitoring according to the invention.
Figure 8B:
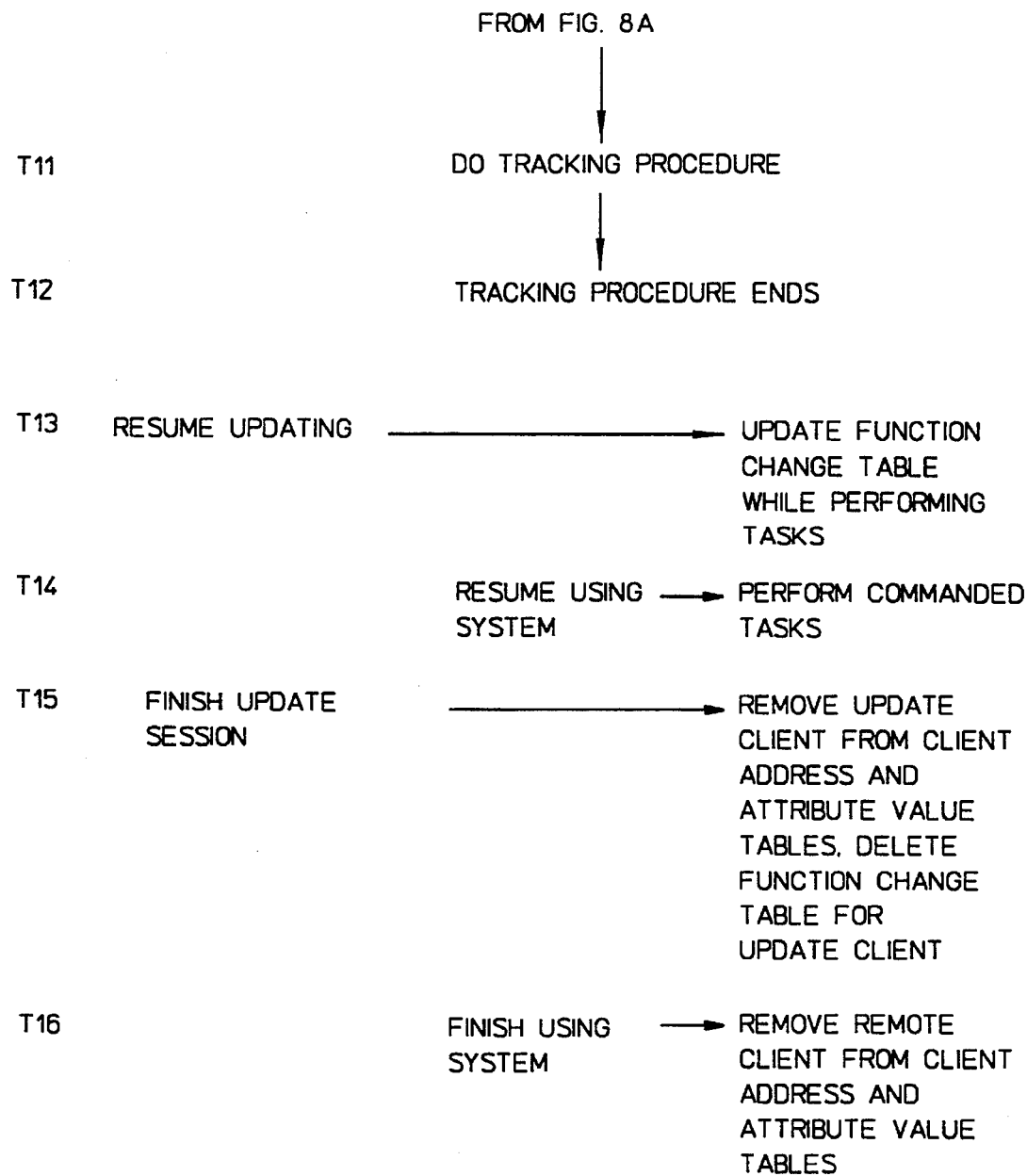

A typical sequence of events during a database update session which includes monitoring according to the invention is depicted in time chart form in FIGS. 8A and 8B. The term "update client" refers to a client program which initiates an update session; the term "remote client" refers to some other client which requests monitoring of an attribute during the time the update client is updating the database.

At time T1 the update client begins the update session. The database system creates a Function Change table to keep a record of any extensional function update calls initiated as a result of updates performed by the update client (see block 202 of FIG. 2).

At time T2 the update client begins issuing update commands and the system responds by performing tasks as commanded. At time T3, which may be the same as time T2 or any time thereafter, the update client requests that a certain attribute be monitored. Along with this request, the client specifies one or more of the criteria for issuing a notification. As discussed above, these criteria include a minimum amount of change in the value of the monitored attribute; a minimum amount of time since the occurrence of some event, typically a previous change in value of the monitored attribute; a nervousness indicator; and a synchronous initiation. The system adds the update client to the Client Address and Attribute Value tables (see the Request Monitoring procedure of FIG. 1).

Thereafter, beginning at time T4 the update client continues updating and the system updates the Function Change table (see block 205 of FIG. 2) while it performs the tasks as commanded.

At time T5 the remote client begins using the system. If the remote client were to initiate an update session, another Function Change table would be created, but for purposes of the session depicted in FIGS. 8A and 8B it is assumed that the remote client is doing something else with the database system and therefore no Function Change table is created for that client. The system performs tasks as commanded by the remote client.

At time T6, which could be any time after T5, the remote client requests monitoring of the same attribute as the update client is monitoring and specifies the desired tuning criteria; the system thereupon adds the remote client to the Client Address and Attribute Value tables. Thereafter (at time T7) the remote client continues using the system and the system performs tasks as commanded.

At time T8 the update client decides to commit whatever updates it has initiated. In response, the system determines whether the specified monitoring criterion has been satisfied. If the criterion has been satisfied, the update client's monitor server is notified. The monitor server interrupts the client (time T9) and invokes the tracking procedure which the update client had designated earlier at time T3, when it first requested monitoring. The invoked procedure ends at time T10 and the system continues by clearing the Function Change table, committing the data, and notifying the remote client's monitor server, and committing the data. Of course, if the remote client had specified synchronous notification, the actual commit would be delayed until after the remote client had been notified.

The remote client is interrupted by its monitor server (time T11) and performs its predesignated tracking procedure, finishing at time T12. Meanwhile, at time T13 the update client resumes updating and the system again updates the Function Change table while performing tasks commanded by the update client. At time T14 the remote client, having finished its tracking procedure, also resumes using the system.

Times T11, T12, T13 and T14 are shown as being sequential. It will be apparent that the update client can resume at any time after its tracking procedure ends, and the remote client can resume at any time after its tracking procedure ends. Thus, T13 may be any time after T10, and T14 may be any time after T12.

If the update client and the remote client had specified different monitor criteria, each would receive notifications as appropriate according to the criterion specified by each.

If there were another change in the value of the monitored attribute, the clients would again be interrupted. However, for purposes of the example it is assumed that there are no further changes and that the update client ends the update session at time T15. The system deletes the Function Change table for that client and removes the client from the Client Address and Attribute Value tables.

At time T16 the remote client ends its use of the system and it too is removed from the tables. Time 16 is shown as being later than time T15 but of course either client may finish before the other, and if the remote client finishes first then T16 would be prior to T15.

The example as depicted in FIGS. 8A and 8B is intended only to illustrate a relatively simple set of transactions. It will be apparent that a plurality of clients might be using the system at any given time and that various ones of the clients might update the database or request monitoring, each with one or more monitoring criteria, during various overlapping intervals of time. The various steps of the method as described and illustrated may occur many times during an update session as various monitor requests are received and various changed data are committed to the database.

Figure 9:
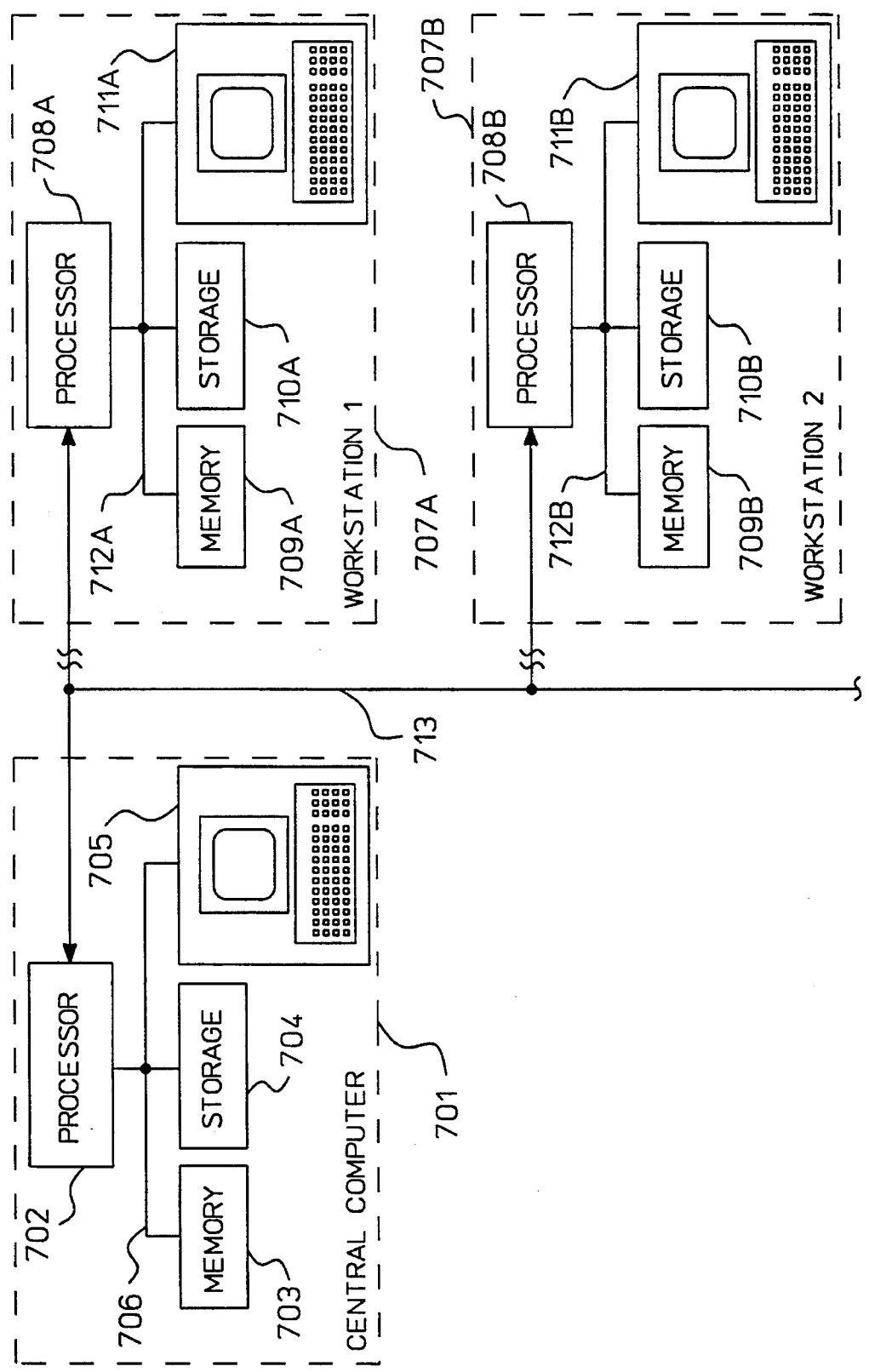
FIG. 9 is a block diagram of a computer system which includes an object-oriented database system including monitoring according to the invention.

An example of a computer system on which the method of the invention can be implemented is shown in FIG. 9. The system includes a central computer 701 having a central processor 702, a main memory 703, storage such as a magnetic disk drive 704, and a terminal 705, all interconnected by a bus 706. A plurality of workstations 707A and 707B, having respectively a local processor 708A and B, a memory 709A and B, storage 710A and B, and a terminal 711A and B, all interconnected by a bus 712A and B, are connected to the central computer 701 by a communications link 713. The communications link 713 may be a dedicated wire system, a telephone connection, a microwave system, or most any means by which the central computer 701 and the workstations 707A and B can communicate with each other.

Figure 10:
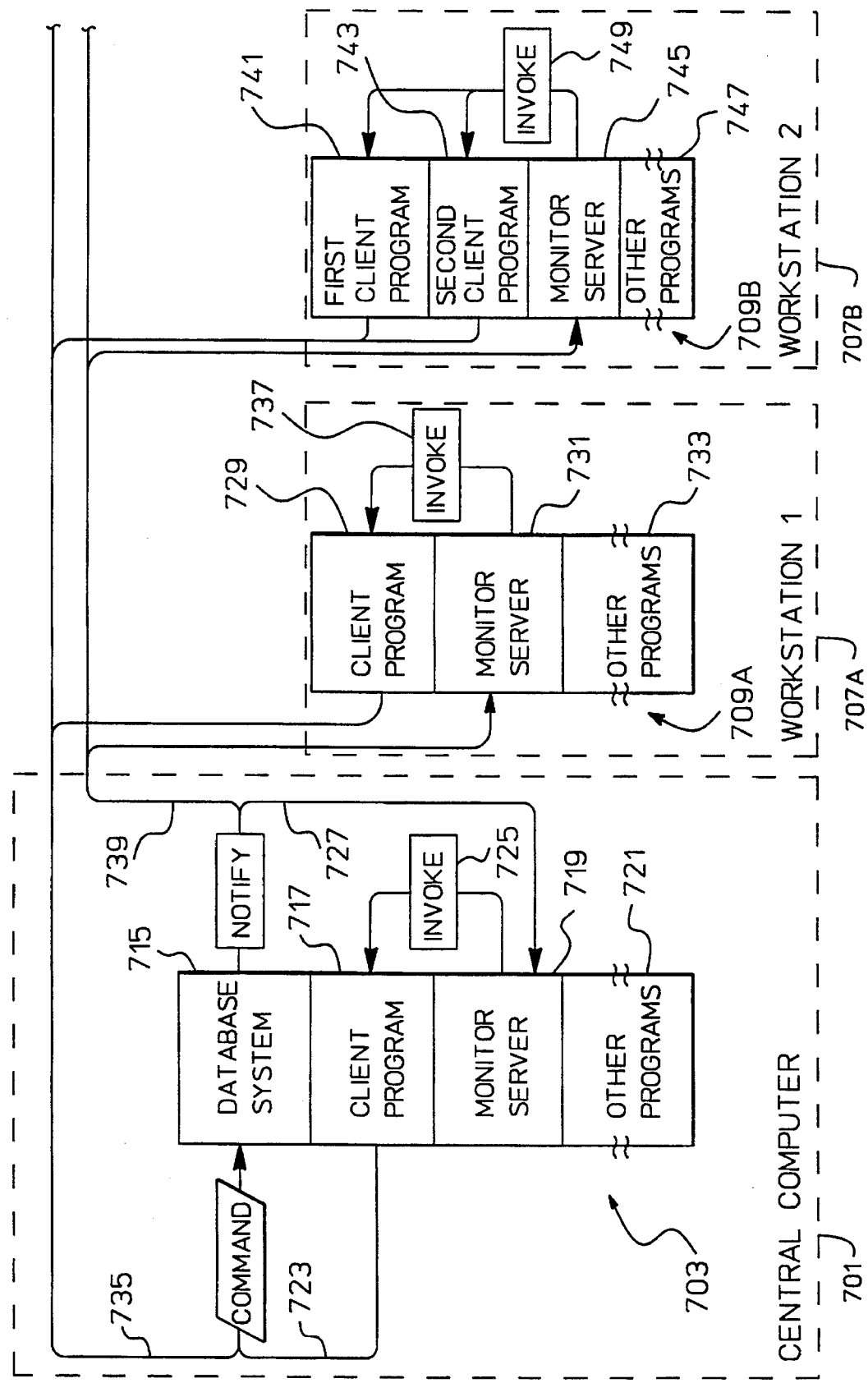
FIG. 10 is a block diagram of communication flow among portions of the system shown in FIG. 9.

An example of how communications might pass among client programs and the database system is shown in FIG. 10. For purposes of discussion all software and data are depicted as residing in main memory, but it will be apparent that in a real system some of the software and data are actually resident in mass storage and are called into main memory as needed. Also, certain communication channels are depicted as physical lines of communication but may actually exist in some other form such as instructions which pass information back and forth among different computer programs or parts of a program.

The memory 703 of the main computer 701 contains the database system (software and data) 715, a client program 717, a monitor server 719, and other programs 721. The client program 717 can issue commands to the database through a communication channel 723. The monitor server 719 can interrupt the client program and invoke a predesignated procedure through a communication channel 725. The monitor server 719 receives notifications from the database 715 through a communication channel 727.

The memory 709A of the workstation 707A contains a client program 729, a monitor server 731, and other programs 733. The client program 729 can issue commands to the database through a communication channel 735. The monitor server 731 can interrupt the client program and invoke a predesignated procedure through a communication channel 737. The monitor server 731 receives notifications from the database 715 through a communication channel 739.

The memory 709B of the workstation 707B contains two client programs 741 and 743, a monitor server 745, and other programs 747. The client programs 741 and 743 can issue commands to the database through the communication channel 735. The monitor server 745 can interrupt either or both of the client programs 741 and 743 and invoke predesignated procedures through a communication channel 749. The monitor server 745 receives notifications from the database 715 through the communication channel 739.

In the system as illustrated in FIGS. 9 and 10, one or more of the client programs may be running at any given time and, as discussed in connection with the time chart of FIGS. 8A and 8B, may issue commands to the database at various times. When monitored attribute values change the database issues notifications to whichever clients have requested notification of such changes if the monitor criteria specified by the various clients have been satisfied, and the respective monitor servers thereupon interrupt their respective clients and invoke whichever procedures have been predesignated by those clients. Any given workstation, or the central computer, may have zero, one or many client programs active at any given time.

High efficiency is achieved by the method of the invention in part by minimizing system overhead as described and in part by localizing any monitoring which is being done. From the preceding discussion it will be apparent that the monitoring can be localized as to time, client, object and attribute as desired.

Thus, for example, a client program can start and stop a monitor so that monitoring does not take place except during a time when the client actually requires the monitoring. A procedure for stopping a monitor has been illustrated in FIGS. 8A and 8B as being utilized when a client ends a session, but it will be apparent that such a procedure, which requires only that the client be deleted from the Client Address and Attribute Value tables, could be performed upon request of a client at any time even if the client continues to use the database system. It will also be apparent that a client could change its monitor criteria to increase or reduce the sensitivity of the monitor.

Localizing the monitoring as to client is inherent in the method of the invention in that monitoring only takes place when requested by a client. In addition, if a client becomes inactive without instructing the system to cease monitoring, monitoring can nevertheless be stopped, for example by periodic checks run by system to find out which clients are active and which have ceased to be active.

The monitoring can be localized as to object by monitoring only attributes of specified (focused) objects rather than monitoring all objects of a given type. Finally, as already discussed the monitoring is localized as to attribute by monitoring only desired attributes, not all attributes of a given object.

Two examples of the use of tuning parameters as monitor criteria will now be provided.

Figure 11:
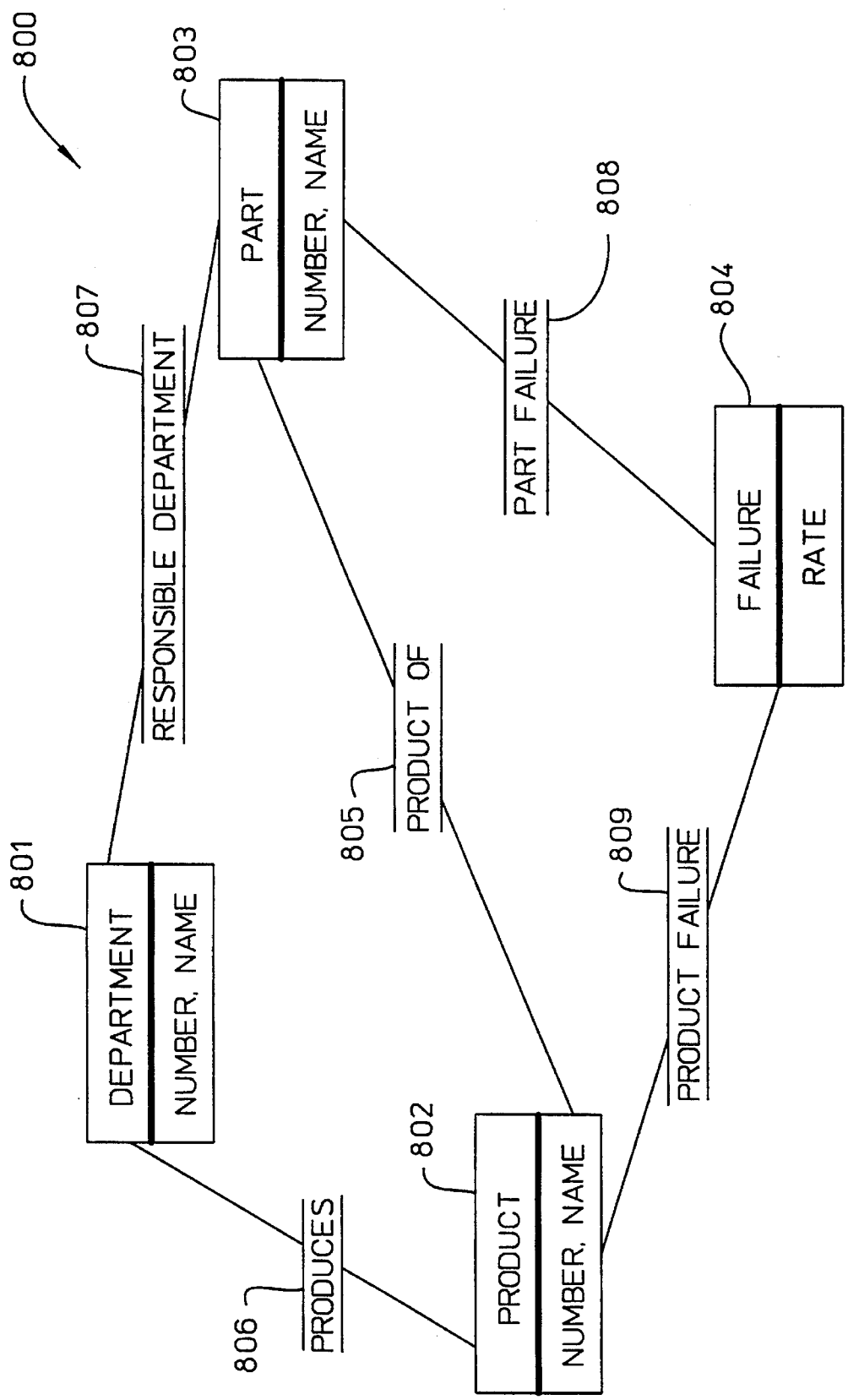
FIG. 11 shows the structure of a manufacturing database which is used as an illustrative example of an embodiment of the invention.

In the first example a manufacturing database generally 800 is used to keep track of products and parts, as illustrated in FIG. 11. The database 800 includes four types of entities: a Department entity 801, a Product entity 802, a Part entity 803, and a Failure entity 804. Each product is characterized by a model number and a name and is represented in the database as an entity of type Product. Similarly, each part is characterized by a part number and name and is represented as an entity of type Part, and each department is characterized by a department number and name and is represented as an entity of type Deparment. A relationship ProductOf 805 defines which products use a given part. A relationship Produces 806 defines which products are manufactured by which department, and a relationship ResponsibleDepartment 807 defines which department is responsible for servicing which parts.

Failures of parts are reported by field engineers. These failure reports are used to calculate failure rates. Each such rate is represented in the database as an entity of type Failure. A relationship PartFailure 808 between parts and failure rates, and a relationship ProductFailure 809 between products and failure rates, together define which parts are failing in which products and with which failure rates.

The database of this example would be defined in the IRIS schema as set forth in Table 1 (it should be noted that IRIS supports set valued functions).

TABLE 1

IRIS Schema for Parts Database

```
/* Entities of Manufacturing Database as IRIS types */
create type Department(
        Number          Charstring,
        Name            Charstring);
create type Product(
        Number          Integer,
        Name            Charstring);
create type Failure(
        FailureRate     Real);
create type Part(
        Number          Charstring,
        Name            Charstring);
/* Relationships */
    create      function    ResponsibleDepartment(Part)   ->
Department;
    create function Produces(Department) -> Product;
    create function ProductOf(Part) -> Product;
    create function ProductFailure(Failure) -> Product;
    create function PartFailure(Part) -> Failure;
```

In the example, there are two clients that want to monitor attributes of the database. A service department wants to be notified if the failure rate of a part for which that department is responsible exceeds a certain threshold, and the producer wants to be notified if the failure rate for a certain part becomes very significant. Monitors that accomplish these notifications are called "failure rate monitors".

OSQL implementations of queries that might be monitored by a service department and a producing department to obtain these desired notifications are shown in Tables 2 and 3 respectively.

TABLE 2

Queries Monitored by Service Department

```
    create function ServiceReport(Department d, Integer
th) ->
        <Charstring prn, Charstring pan, Integer ta> as
        select prn,pan,ta
        for each Failure f, Part pa, Product pr,
                Charstring prn, Charstring pan, Integer
ta where
        ResponsibleDepartment(pa) = d and
        PartFailure(pa) = f and
        Rate(f) = ta and
        Product(f) = pr and
        prn = Name(pr) and
        pan = Name(pa) and
        th < ta
```

TABLE 3

Queries Monitored by Producing Department

```
    create function ProducerReport (Department d, Integer
th) ->
        <Charstring prn, Charstring pan, Integer ta> as
        select prn,pan,ta
        for each Failure f, Part pa, Product pr,
                Charstring prn, Charstring pan, Integer
ta where
        Produces(d) = pr and
        Product(f) = pr and
        PartFailure(pa) = f and
        Rate(f) = ta and
        prn = Name(pr) and
        pan = Name(pa) and
        th < ta
```

For service departments the query "ServiceReport" uses the relationship "ResponsibleDepartment" to locate the parts serviced by the department. For producing departments the query "ProducerReport" uses the relationship "Produces" to find which products produced by the department have failing parts.

A database update program, which for convenience will be referred to as the "failure rate reporter" is run at fixed time intervals. It is run by customers to report part failures and to store this information in the database. The failure rate reporter also calculates current failure rates from the reports received for the various parts during the current time interval. The failure rate reporter is independent of the service and producer monitors.

Figure 12:
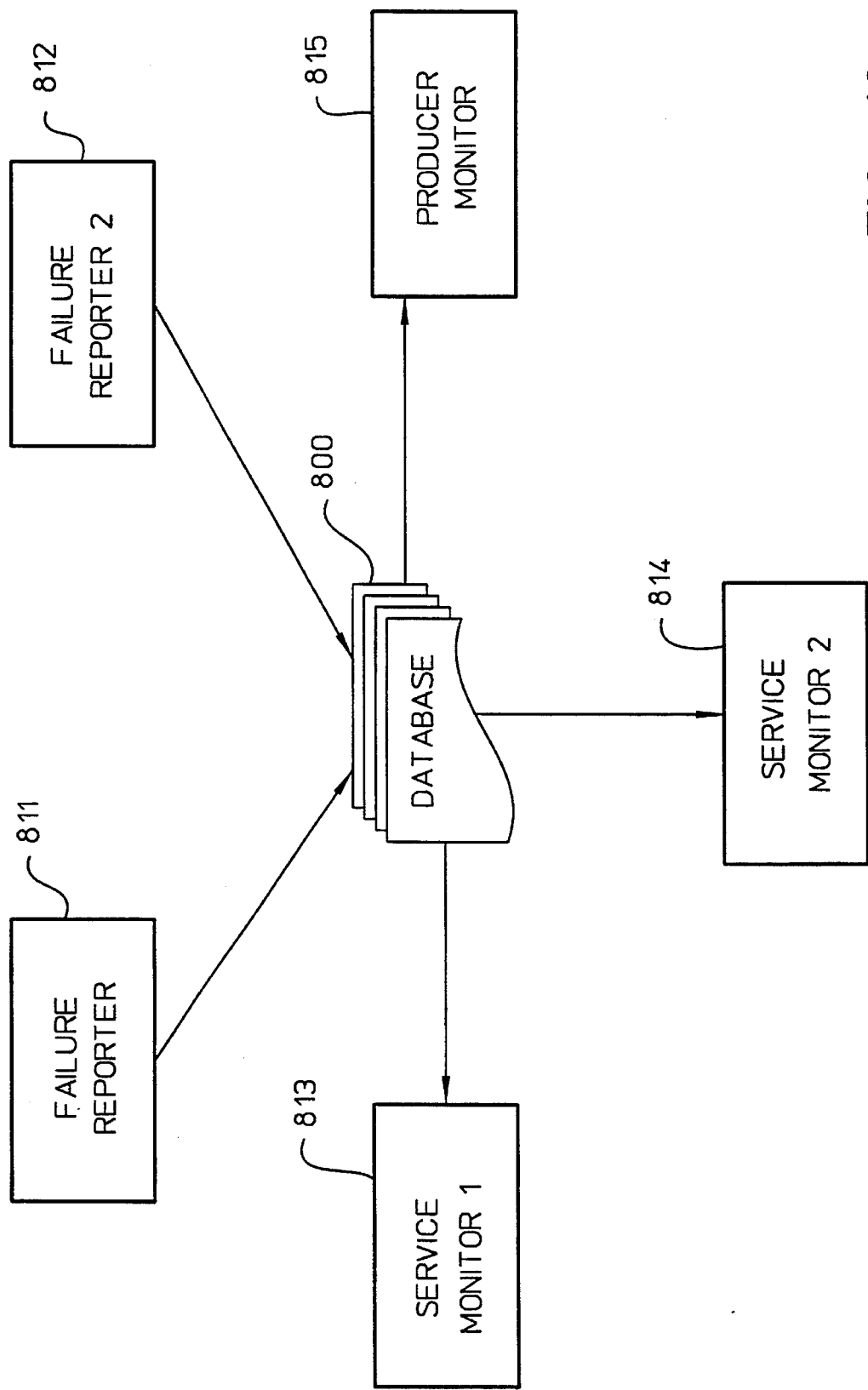
FIG. 12 shows information flow between the database of FIG. 11 and various client programs.

In the example, two failure rate reporters 811 and 812 feed data into the database 800, as shown in FIG. 12. The database is monitored by two service monitors 813 and 814 and a producer monitor 815. Each reporter and monitor would ordinarily run on a different workstation, although it would be possible for more than one of them to run on the same machine.

Transmission times between the various computers are not negligible, and therefore it is not desirable for the failure rate reporters to have to wait for notifications to be generated and sent. Thus, this example illustrates a situation in which synchronous notification would not be desirable.

Monitoring criteria would be set as follows. One service department, say the Electric Repair Department, might wish to be notified of any change larger than 5% in the failure rate of any part for which that department is responsible. The department might also specify that it wishes to receive notifications not more often than once per minute. Thus, in this example a relative change value criterion of 5% and a tracking delay time criterion of one minute are specified.

The user might also specify a fixed critical failure rate threshold so that no part with a failure rate lower than that threshold is reported. Different users typically would use different thresholds according to their responsibilities. For example, the Electric Repair Department might specify a threshold failure rate of 12 failures per day.

A producing department might wish to have a lower reactivity. For example, the Widget Producer Department might specify a threshold of 50 failures per day, a relative change value of 10%, and a tracking delay time criterion of two hours. Using such a large tracking delay time might be especially useful if the producing department were physically located a great distance away such that transmission cost were relatively high.

In a conventional database system, a client such as the service and producing departments would have to regularly query the database for every situation they might regard as important. With database monitors the system actively notifies the clients. The tuning parameters optimize the performance of the system by assuring that each client is notified neither too often nor not often enough.

A second example of the use of tuning parameters as monitoring criteria is provided by an application of the principles of the invention to the task of view object materialization. According to the view object concept, data are stored persistently in a back-end relational database system. Objects are materialized in an application when data are retrieved. Views are used to reconfigure the data such that only data that are relevant for the application are materialized.

As discussed previously, an object-oriented database such as IRIS allows the programmer to specify derived functions which separate the representation of objects from their usage and thereby give a preferred view for a particular application. However, even in such database systems there are times when it is necessary to materialize a view object. In fact, database monitors themselves are preferably implemented by means of view objects.

As has been discussed above, database monitors use various system tables, some of which are updated very seldom. For example, when a monitor is defined (compiled) the system analyzes the query to be monitored and stores dependency information in system tables. This is done only once for each monitored query. The dependency information is traversed when transactions screen out non-monitored updates. The dependency information is thus updated rarely but accessed intensively and is therefore a good candidate for materialization as view objects. These view objects should be organized for quick traversal of the screening tests.

It is important that the view objects not reference stale data. Atomic transactions are used and therefore the view objects must be flushed at the end of each transaction. This results in inefficiency in that every update transaction uses the dependency table to conduct any screening tests. If more than one commit is done during an update session, it will be necessary to re-materialize the dependency table for each transaction.

These problems are avoided by monitoring the state of the dependency table and letting the tracker invalidate the view object when the state changes. Such changes actually happen only when a monitor is compiled, which is very seldom. Whenever it is necessary to traverse the dependency table, the system first checks to find out whether the view object is invalid, and only if the object is invalid must it be re-materialized.

In this application (view materialization of the dependency table), synchronous initiation is used to avoid the risk of referencing stale data. This makes it possible to test in the client whether the cache has been invalidated. Also a nervousness parameter is used, indicating that only a screening test is employed to determine whether to send notifications. The screening test gives satisfactory results because the reactivity is expected to be very low and almost every change to the dependency table will be significant.

Thus, in this second example synchronous initiation and a nervousness parameter are used; neither delay time nor change value parameters are used. In some other application a change value parameter might be used together with synchronous initiation or with a nervousness parameter; a delay time parameter ordinarily would not be used together with synchronous initiation.

View materialization may be considered as a way to implement an "identity connection". The identity connection was introduced by Wiederhold et al., "Modeling Asynchrony in Distributed Databases", Third International Conference on Data Engineering, Los Angeles, Calif., Feb. 3–5, 1987, pp. 246–250. The identity connection defines replicated attributes of relations and is regularly updated. A derivation formula can transform the desired attribute. Wiederhold, "Connections", in Wiederhold et al., Managing Objects in a Relational Framework, Stanford Computer Science Report # STAN-CS-89-1245, 1989.

Implementing an identity connection by view materialization is described, for example, in Blakely et al., "Efficiently Updating Materialized Views", and Lindsay et al., "A Snapshot Differential Refresh Algorithm", both in Proc. SIGMOD, Washington, D.C., 1986, pp. 66–71 and 53–60 respectively, and in Tsichritzis et al., "KNOs: Knowledge Acquisition, Dissemination, and Manipulation Objects", ACM Transactions on Office Information Systems, Vol. 5, No. 4, 1987, pp. 96–112.

Database monitors, in turn, can be used to implement an identity connection from persistent data to an application process. The tracker implements an action to be performed when the identity is violated—that is, rather than maintain the connection, the process is notified when the identity is violated. A replicated attribute is implemented with a database monitor by a constantly-running process having a tracker that merely retrieves the monitored data and immediately stores it in the replicated attribute.

The time delay parameter and the change value parameter are used to provide an imperfect connection, the time delay parameter relying on time differences and the change value parameter relying on data differences. Synchronous initiation provides a synchronous connection between data and process. The nervousness parameter controls the efficiency of maintaining the connection.

A database monitor can implement a temporary connection because the monitor is only active during the execution of the connected process.

An "event" can reestablish a connection. This is implemented with a database monitor by recording the time of the event and then monitoring the recorded data.

From the foregoing it will be apparent that the invention provides an efficient method of monitoring objects in an interactive object-oriented database system. Client programs participate actively in the monitoring by issuing monitor requests that specify one or more of the four tuning parameters: change value, tracking delay time, synchronous initiation and nervousness. The tuning makes it possible for the client to interact with the database only when necessary, and not less often than necessary. A large number of clients, located in different physical places and running on different computers, can access a very large database in a highly efficient manner.

Although certain specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

I claim:

1. In a computer database system, a method of monitoring an object in a database in response to a request from any of a plurality of client programs, the method comprising the following steps carried out by the system:

keeping a record of any request from a client to monitor an attribute of the object;

keeping a record indicating any interdependence relationships between the attribute being monitored and other attributes;

keeping a record of a value of each attribute being monitored by accessing said interdependence relationship record;

during a database update session, keeping a record of any database update transactions initiated by a client; and if a client which has initiated an update transaction requests that said update transaction be stored in the database, determining whether a predetermined criterion pertaining to a monitored attribute has been satisfied and, if the criterion has been satisfied, notifying any client which had requested monitoring of that attribute;

wherein said criterion comprises either of:

a) a minimum change value in said monitored attribute and determining whether the criterion has been satisfied comprises:

determining whether said monitored attribute may have been affected by said transaction; and if said attribute may have been affected, determining whether the value of the attribute has changed by an amount which exceeds a minimum change value by computing an updated value for the attribute and comparing the updated value with the value in the attribute value record; or b) a minimum time interval and determining whether said criterion has been satisfied comprises:

determining whether said monitored attribute may have been affected by said transaction;

if said attribute may have been affected, determining whether an amount of time that exceeds a minimum time interval has elapsed subsequent to a previous event;

if the minimum time interval has elapsed, determining whether the value of the attribute has changed by computing an updated value for the attribute and comparing the updated value with the value in the attribute value record.

2. A method as in claim 1 wherein the previous event comprises a previous change in the value of said attribute.

3. A method as in claim 1 wherein the criterion comprises a minimum change value in said monitored attribute and a minimum time interval, and determining whether the criterion has been satisfied comprises:

determining whether said monitored attribute may have been affected by said transaction;

if said attribute may have been affected, determining whether an amount of time that exceeds the minimum time interval has elapsed subsequent to a previous event;

if the minimum time interval has elapsed, determining whether the value of the attribute has changed by an amount which exceeds the minimum change value by computing an updated value for the attribute and comparing the updated value with the value in the attribute value record.

4. A method as in claim 1 wherein the criterion comprises any change in a specified relation in the database and determining whether the criterion has been satisfied comprises determining whether there has been an update to said relation.

5. A method as in claim 4 wherein determining whether there has been an update to a specified relation comprises determining whether there has been an update to a specified item in the relation.

6. A method as in claim 1 wherein:

the criterion comprises a change in the value of said monitored attribute;

determining whether the criterion has been satisfied comprises determining whether said monitored attribute may have been affected by said transaction, and if said attribute may have been affected, determining whether the value of the attribute has changed by computing an updated value for the attribute and comparing the updated value with the value in the attribute value record; and notifying a client comprises notifying the client synchronously with storing the update transaction in the database.

7. A method as in claim 1 wherein:

the criterion comprises a minimum change value in said monitored attribute;

determining whether the criterion has been satisfied comprises determining whether said monitored attribute may have been affected by said transaction, and if said attribute may have been affected, determining whether the value of the attribute has changed by an amount which exceeds the minimum change value by computing an updated value for the attribute and comparing the updated value with the value in the attribute value record; and notifying a client comprises notifying the client synchronously with storing the update transaction in the database.

8. In a computer database system, a method of monitoring an object in a database in response to a request from any of a plurality of client programs, the method comprising the following steps carried out by the system:

keeping a record of any request from a client to monitor an attribute of the object;

keeping a record indicating any interdependence relationships between the attribute being monitored and other attributes;

keeping a record of a value of each attribute being monitored by accessing said interdependence relationship record;

during a database update session, keeping a record of any database update transactions initiated by a client; and if a client requests notification of any changes which have occurred in an attribute then being monitored for said client, determining whether a predetermined criterion pertaining to a change in the monitored attribute has been satisfied and, if the criterion has been satisfied, notifying said client that the criterion has been satisfied;

wherein said criterion comprises either of:

a) a minimum change value in said monitored attribute and determining whether the criterion has been satisfied comprises:

determining whether said monitored attribute may have been affected by said transaction; and if said attribute may have been affected, determining whether the value of the attribute has changed by an amount which exceeds a minimum change value by computing an updated value for the attribute and comparing the updated value with the value in the attribute value record; or b) a minimum time interval and determining whether said criterion has been satisfied comprises:

determining whether said monitored attribute may have been affected by said transaction;

if said attribute may have been affected, determining whether an amount of time that exceeds a minimum time interval has elapsed subsequent to a previous event;

if the minimum time interval has elapsed, determining whether the value of the attribute has changed by computing an updated value for the attribute and comparing the updated value with the value in the attribute value record.

9. A method as in claim 8 wherein the previous event comprises a previous change in the value of said attribute.

10. A method as in claim 8 wherein the criterion comprises a minimum change value in said monitored attribute and a minimum time interval, and determining whether the criterion has been satisfied comprises:

determining whether said monitored attribute may have been affected by said transaction;

if said attribute may have been affected, determining whether an amount of time that exceeds the minimum time interval has elapsed subsequent to a previous event;

if the minimum time interval has elapsed, determining whether the value of the attribute has changed by an amount which exceeds the minimum change value by computing an updated value for the attribute and comparing the updated value with the value in the attribute value record.

11. A method as in claim 8 wherein the criterion comprises any change in a specified relation in the database and determining whether the criterion has been satisfied comprises determining whether there has been an update to said relation.

12. A method as in claim 11 wherein determining whether there has been an update to a specified relation comprises determining whether there has been an update to a specified item in the relation.

* * * * *